United States Patent Office 3,238,259
Patented Mar. 1, 1966

3,238,259
POLYHALOBICYCLO-[2.2.1]-HEPT-5-EN-2-YL BENZYL GUANIDINES
Carleton W. Roberts, Midland, and Daniel H. Haigh, Beaverton, Mich., assignors to The Dow Chemical Company, Midland, Mich., a corporation of Delaware
No Drawing. Filed Oct. 24, 1963, Ser. No. 318,505
3 Claims. (Cl. 260—564)

This application is a continuation-in-part of our co-pending application Serial No. 240,137, filed November 26, 1962, now abandoned.

This invention relates to organic chemistry, and more particularly to a compound selected from the group consisting of

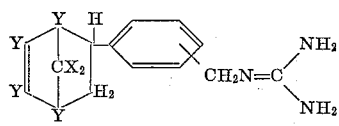

and a mineral acid addition salt thereof, wherein X represents a member of the group consisting of hydrogen, fluorine, and chlorine, and Y represents a member of the group consisting of chlorine, bromine, and iodine.

The compounds are crystalline solids of limited solubility in water but readily soluble in various organic solvents. They are insecticidal and are toxic to insects of various species.

These new compounds may be prepared by the Diels-Alder diene synthesis. The reaction may be simply carried out by causing a reaction of a cyclopentadiene compound of the formula

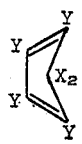

wherein X represents hydrogen, fluorine, or chlorine, and Y represents chlorine, bromine, or iodine, the values hereinbefore indicated, as the diene with, as dienophile, and ar-vinylbenzyl compound of the formula

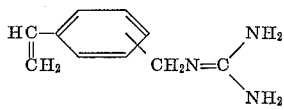

or a mineral acid salt thereof to obtain the adduct product. The reactants are consumed in equimolecular amounts and may thus be supplied to the reaction. It is advantageous but not necessary to use an inert liquid reaction medium, such as xylene, hexane, heptane, octane, nonane, petroleum ether, benzene, toluene, cumene, ethylbenzene, diethylbenzene, ethyltoluene, chlorobenzene, orthodichlorobenzene, chlorotoluene, chloroethylbenzene, chloroxylene, and the like, of which the boiling serves to control the reaction temperature. The reaction may be carried out at any temperature from about 60° C. to about 200° C., but is preferably carried out at about 100° C. to 160° C. A reaction mixture of the reactants and reaction medium, if any, may be brought together in a reaction vessel whereupon the desired reaction takes place to some extent. When more rapid rate of reaction is desired, the reactants may be caused to react at a higher rate by heating the reaction mixture. The reaction usually goes to completion in from about one hour to about 60 hours, with formation of desired product and minor amounts of other substances. The product can be used in a completely crude form for many of its advantageous uses. When it is desired to recover the desired compound essentially pure, the product of reaction can be purified in known ways, as by fractional crystallization.

Suitable diene starting materials in the present synthesis include hexachlorocyclopentadiene, 1,2,3,4-tetrachlorocyclopentadiene, 1,2,3,4-tetrabromo-5,5-difluorocyclopentadiene, and the like.

The following examples without more will enable those skilled in the art to practice the present invention.

*Example 1.—Preparation of 2-(p-(1,4,5,6,7,7-hexachlorobicyclo[2.2.1]-hept-5-en-2-yl)-benzyl)-2-guanidine hydrochloride*

A mixture of 78 grams (0.185 mole) of 2-(ar-chloromethylphenyl) 1,4,5,6,7,7 - hexachlorobicyclo - [2.2.1]-heptene-5, 16.5 grams (0.28 mole) guanidine and 500 milliliters isopropanol are placed in a one liter round-bottom flask over a steam bath and equipped with a reflux condenser, and heated to reflux temperature, about 85° C. The resulting mixture is heated under reflux for 16 hours to prepare the present product which precipitates as a solid in the mixture. The reaction mixture is cooled and filtered to obtain a crude product as residue. The residue solid is recrystallized from a mixture of 3 parts methanol and 1 part chloroform to obtain, in good yield, a white crystalline solid 2-(p-(1,4,5,6,7,7-hexachlorobicyclo-[2.2.1]hept-5-en-2-yl)benzyl) - 2-guanidine hydrochloride product melting with at least incipient decomposition at a temperature between 250 and 300° C. Infrared spectrum analysis confirms the assigned structure. The product has insecticidal properties.

The starting 2-(ar-chloromethylphenyl)-1,4,5,6,7,7-hexachlorobicyclo-[2.2.1]heptene-5 starting material is readily prepared as a Diels-Alder adduct of ar-vinylbenzyl chloride and hexachlorocyclopentadiene. The use of adducts with, for example, 1,2,3,4-tetrabromo-5,5-difluorocyclopentadiene obtains the correspondingly halogenated chloromethylphenyl adduct and, therefrom, a correspondingly halogenated product of the present invention.

*Example II.—Preparation of 2-(p-(1,4,5,6-tetrachlorobicyclo[2.2.1]-hept-5-en-2-yl)-benzyl)-guanidine hydrobromide*

A mixture of 242 grams (1.0 mole) of p-vinylbenzyl guanidine hydrobromide and 500 milliliters toluene is placed in a one liter, round-bottomed flask equipped with heating mantle, dropping funnel and reflux condenser, and heated to reflux temperature, about 110–120° C. Thereto during 45 minutes is added, dropwise, 201 grams (1 mole) 1,2,3,4-tetrachlorocyclopentadiene. The resulting mixture is heated under reflux for 30 hours to prepare the present product. The reaction mixture is cooled and filtered to obtain a crude product as residue. The residue solid is recrystallized from a mixture of 3 parts methanol and 1 part chloroform, to obtain in good yield, a white solid 2-(p-(1,4,5,6-tetrachlorobicyclo[2.2.1]-hept-5-en-2-yl)benzyl)-guanidine hydrobromide product melting with decomposition at a temperature above 250° C. and useful as an insecticide. Infrared spectrum analysis confirms the assigned structure.

In similar procedures the other products of the present invention are readily prepared.

Illustrative of utility in the present compounds, the compound 2-(p-(1,4,5,6,7,7 - hexachlorobicyclo[2.2.1]-hept-5-en-2-yl)benzyl)-2-guanidine hydrochloride is dispersed in a highly volatile compressed halocarbon solvent-propellant. One suitable propellant is monochlorodifluoromethane. Dispersed in such substance, under pressure and, with a small amount of acetone as cosolvent whereby most of it is maintained liquid until pressure is released, the substance constitutes an insecticidal aerosol mixture. From a valve-equipped pressure vessel, this substance is discharged into the air over a shallow body of water containing live larvae of mosquitoes of various species. A relatively uniform dispersion of the compound over the water surfaces is effected, at the rate of several milligrams per square decimeter, the exact amount of deposit not determined. The conditions ambient the body of water are generally favorable to the growth of mosquito larvae. Twenty-four hours after application, the water is examined for mosquito larvae: numerous dead larvae are found, and no live ones. A check area similarly treated except that the present guanidine compound is omitted shows no significant mortality of mosquito larvae.

We claim:
1. Compound selected from the group consisting of:

[structure: bicyclic ring with Y substituents and $CX_2$ bridge, attached to a benzyl group with $CH_2N=C(NH_2)NH_2$]

and a mineral acid addition salt thereof, wherein X is a member of one of the group consisting of hydrogen, fluorine, and chlorine, and represents a member of the group consisting of chlorine, bromine, and iodine.

2. 2-(p-(1,4,5,6,7,7 - hexachlorobicyclo[2.2.1]-hept-5-en-2-yl)benzyl)-2-guanidine hydrochloride.

3. 2-(p-(1,4,5,6 - tetrachlorobicyclo[2.2.1] - hept-5-en-2-yl)benzyl)-guanidine hydrobromide.

No references cited.

CHARLES B. PARKER, *Primary Examiner.*